FIG. 4.
FIG. 5.
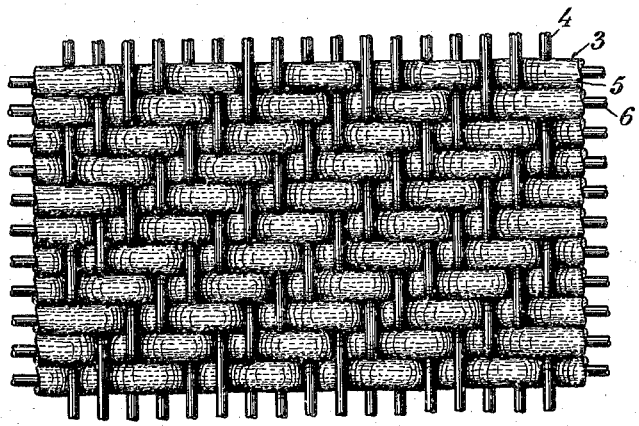
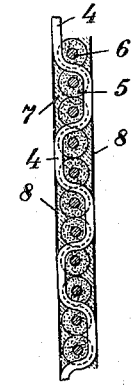
FIG. 6.
FIG. 7.
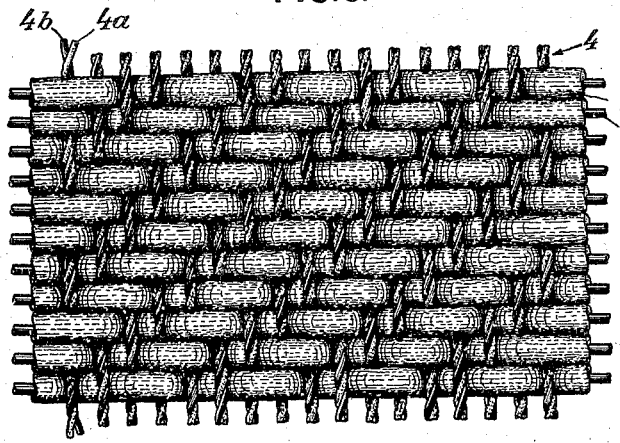
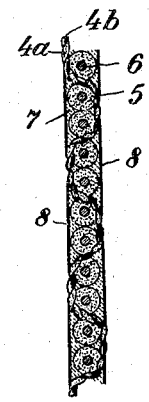
FIG. 8.
FIG. 9.
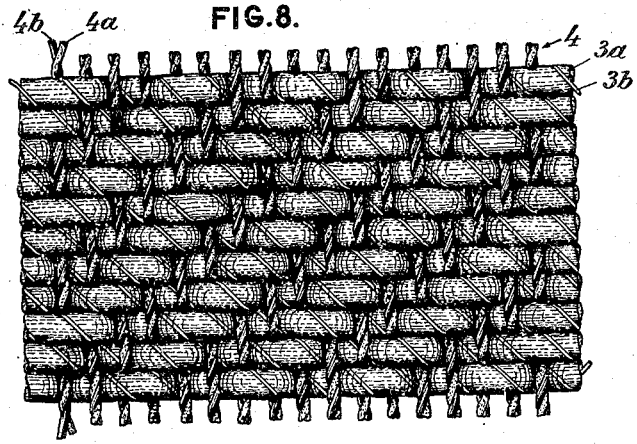
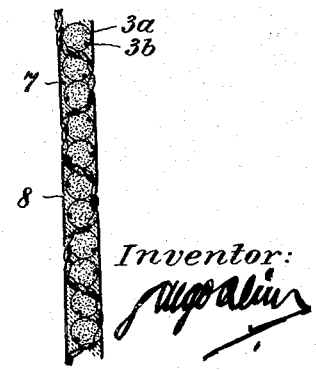

Patented Aug. 9, 1938

2,126,042

UNITED STATES PATENT OFFICE 2,126,042

LAMINATED SPRING

Hugo Reinz, Berlin-Charlottenburg, Germany

Application May 28, 1935, Serial No. 23,874
In Austria June 2, 1934

4 Claims. (Cl. 267—47)

This invention relates to laminated springs for motor vehicles, railway wagons and the like.

The operation of these springs, after they have been in use a short time, is mostly detrimentally affected by the penetration of moisture and dirt between the individual spring laminations causing a rust deposit. This results in strong friction between the spring laminations. If a shock is exerted upon the spring while the vehicle is running it does not immediately yield, owing to the adhesion of the laminations but requires a certain force to overcome this adhesion. The laminations only slide one on the other when this force is attained. However, when the adhesion is overcome, the resistance to sliding suddenly decreases and the spring buckles.

The object of the invention is therefore to protect the springs against the penetration of moisture and dirt between the individual laminations, to prevent rust deposits and ensure that the individual laminations have free gentle acting play for sliding one on the other.

It has already been proposed for this purpose to surround the springs with a casing which protects them from external influences and enables lubricant to be fed to the laminations and to be maintained within the spring. Such casings are, however, open to the objection that the springs being covered they cannot be examined by the driver with the result that a spring fracture may exist for a considerable time before it is noticed.

It has also been proposed to feed lubricant to the springs through lubricating channels. These channels can only be produced at considerable expense and they weaken the springs, without, however, protecting them against the penetration of moisture and dirt.

Finally, intermediate layers of a metal which is softer than the spring steel, or of fabric, fibre, paper and the like, have been employed. The metal intermediate layers cannot fulfil their object without auxiliary lubrication which is very difficult to carry out, and the intermediate layers of fabric or the like soon wear out owing to the moderate strength of the fabric.

According to the invention the problem is solved by interposing between the individual laminations layers of a material which, on the one hand by a metallic component form a slide surface and, on the other hand, owing to a soft absorbent component possesses sufficient elasticity to fill the gaps between the laminations and prevent the penetration of dirt and dust and is capable of absorbing a lubricant and a moisture repelling medium.

It has been found that this material can consist of any fabric composed of metal wires and textile materials. For example the fabric may be made of metal threads interwoven with fibrous threads of cotton, jute or other textile materials, asbestos fibres, artificial silk or other cellulose products and the like. The fibrous threads may themselves be combined with metal by means of a metal core or a metal winding. The fabric may also be made in any manner from pure fibrous threads with combined fibre-metal threads.

A combined fabric has been found particularly suitable one thread direction of which, preferably the warp, is formed of bare metal wires, whereas the other thread direction, preferably the weft, consists of a soft plastic thread which is spun for example from cotton fibres, jute fibres, asbestos fibres or the like and may, if necessary, have a core or winding of metal wire. Such fabrics, which have already been used for cylinder head packings, if the bare nonstretchable wires are employed as warp, can be laid so closely that there is practically no gap between the weft threads. In any case it is possible, even in the case of inferior qualities, to set the weft threads so closely that the distance between the individual weft threads is less than one and a half times the thread diameter. Apart from the tensile strength of the warp, which allows the weft to be sharply picked, the plasticity of the weft also serves this purpose in that the warp can become embedded in such a manner that the distance between the weft threads disappears entirely or almost entirely. The density of the fabric thus attainable increases its strength and resistance to such an extent that it is capable of withstanding without premature wear the considerable stressing to which it is subjected as an intermediate layer between the spring laminations.

The fabric described is preferably produced in a twill weave, particularly a zig-zag twill weave. Apart from the fact that the twill weave produces a particularly smooth surface on the fabric, which is important in the present instance, portions of the warp are exposed on the two sides of the fabric of a length corresponding to a double bridging of the weft threads and the individual exposed warp portions are mutually displaced a distance equal to the thickness of a weft thread. Thus, on both sides of the fabric a metallic surface is formed so to say consisting of the different exposed warp portions. If the wire forming the warp is of metal which is of a hardness different from that of the lamination steel, an effect will be obtained by employing this fabric as intermediate layer between the laminations, which corresponds approximately to that of a journal bearing, that is metals always slide on others which are of different hardnesses and consequently produce a low coefficient of friction. The reduction of the coefficient of friction can be improved particularly by employing for the warp metals which behave particularly favorably in this respect relatively to the spring steel, for example phosphor bronze and the like.

To render the fabric repellent to the absorbing of moisture it can be steeped in a water repelling substance, such as artificial resin, or for the weft threads materials may be employed which are water repellent. In this manner the penetration of moisture between the spring laminations is reliably prevented. Dirt can likewise not penetrate between the laminations because the fabric as a whole possesses a certain softness and fills all joints between the spring laminations at least to the extent necessary for attaining the object in view.

To facilitate the sliding of the spring laminations on the metal threads of the fabric, the fabric, after being steeped with water repelling medium, is charged with a lubricant, preferably a dry lubricant, such as graphite. It may be necessary or advantageous to produce by further preliminary treatment a surface on the fabric which increases its absorbency for the lubricant and which reliably retains the lubricant. The graphiting, and if necessary also the preliminary treatment, is preferably carried out on a calender between the rolls of which the fabric is drawn under strong tension and thus absorbs the substances to be applied. The graphite composition, if necessary provided with a binding medium, or the substances for the preliminary treatment is or are by this method fed to the fabric web and rolled on or into the same. The strength of the warp and the density of the fabric enables this method to be employed without destroying the structure. If necessary, one of the rolls may be heated and the other cooled.

When in use, the layer of lubricant which originally covered also the metallic warp threads of the fabric, can be rubbed off. However, the quantity of graphite or the like necessary for the lubrication is then continually supplemented by the soft material of the weft threads, which has absorbed greater quantities of graphite during the graphiting, giving up a portion of its graphite to the sliding portions.

If, as above mentioned, a zig-zag twill weave is employed, it will be preferable, to cut and insert the parts intended for the intermediate layers so that the change of the weave is in the middle of the surface of the spring lamination as, in this manner, the intermediate layers, owing to their displaced weave, will not so easily slip out laterally from between the laminations.

The fabric, no matter whether ordinary or twill or zig-zag twill weave is employed, may, however, be arranged so that the warp threads extend transversely to the longitudinal direction of the springs.

An embodiment of the invention is illustrated by way of example in the accompanying drawings in which:—

Fig. 4 is a plan view showing a portion of a fabric in which the warp consists of bare wires and the weft of fibrous threads with metal core.

Fig. 5 is a longitudinal section of Fig. 4.

Fig. 6 is a plan view showing a portion of a fabric in which the warp consists of fibrous threads with metal winding and the weft of fibrous thread with metal core.

Fig. 7 is a longitudinal section of Fig. 6.

Fig. 8 shows in plan view a portion of a fabric in which the warp and weft consists of fibrous threads with metal winding.

Fig. 9 is a longitudinal section of Fig. 8.

Figure 1:
Fig. 1 is a part side elevation of a laminated spring with intermediate layers.
Figure 2:
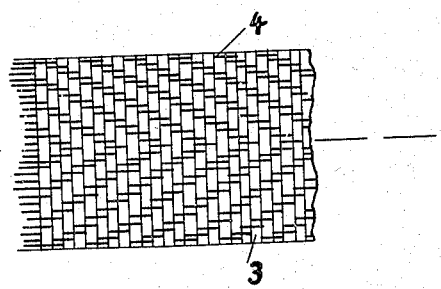
Fig. 2 shows in top plan view a portion of a fabric employed for the intermediate layers and having for example a zig-zag twill weave.
Figure 3:
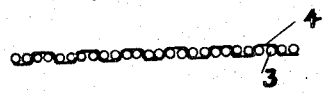
Fig. 3 is a longitudinal section through the middle of Fig. 2.

1 designates the spring laminations, 2 the intermediate layers, 3 the weft threads of soft material, if desired with a metal core or winding, 4 the warp threads which receive the metal components which are to form the sliding surface for the spring laminations. Fig. 3 shows clearly how the twill weave is particularly suitable for producing a kind of sliding surface because the portion of the warp 4 extending over two threads of the weft lies flat.

In the form of construction illustrated in Figs. 4 and 5 the warp threads 4 are formed of bare metal wires and the weft threads 3 of a coating 5 of fibrous material on a core 6 of wire. As the section (Fig. 5) shows, a composition 7 is rolled into and on to the fabric and serves as carrier for the lubricant layer 8. Fig. 5 also shows how the metal warp threads 4 lie on the surface of the intermediate layer and form the sliding surfaces.

The form of construction illustrated in Figs. 6 and 7 corresponds to the construction of the preceding figures. Only the warp threads 4 are made of yarn formed by twisting a fibrous thread 4a with a wire 4b. The scope of the invention covers the use of yarns composed of several wires and several fibrous threads. The essential point, as shown in Fig. 7, is that portions of the metal wires lie on the surface of the fabric and form the metallic sliding surface.

According to Figs. 8 and 9 the weft threads 3 are also composed of fibrous threads 3a about which the metal wires 3b are wound. In this form of construction the windings 3b of the weft threads participate in the formation of the metallic sliding surface. The lubricant layer 8 and the composition under layer 7 for the lubricant layer are arranged in this same way in Figs. 6 to 9 as in Figs. 4 and 5.

The invention thus solves the problems mentioned at the outset. The movement of the springs is improved by the journal bearing-like effect between the spring lamination and the intermediate fabric layers and is assisted by the graphite or other lubricant. The penetration of moisture between the spring laminations is prevented by the water-repellent impregnation of the intermediate layer, and dirt cannot enter between the laminations as the relative softness of the intermediate layers allows the spaces to be filled between the laminations to a sufficient extent. The durability and long life of the intermediate layers is ensured by the extraordinary closeness of the fabric and its resultant strength and resistance.

I claim:—

1. Relatively thin intermediate web layers for laminated springs consisting of a densely woven fabric comprising wires and soft absorbing fibrous material, said metal wires being juxtaposed and woven to present large portions of the wires on the surface of the fabric and to provide a metallic sliding surface for the leaves of a spring, said soft absorbing fibrous material comprising threads laid side by side and having uninterrupted contact throughout their lengths, a lubricant absorbing material rolled into the fabric on both surfaces thereof and a lubricant pressed onto the surface of the fabric.

2. An intermediate web layer for laminated springs of the type set forth in claim 1, characterized by the lubricant absorbing material containing artificial resin that hardens to render the web layer water repellent and said web layer being of twill weave character.

3. An intermediate web layer for laminated springs of the type set forth in claim 1, characterized by the threads of the fabric extending in one direction being bare wires and the other threads for the principal parts thereof constituting the soft absorbing fibrous material.

4. An intermediate web layer for laminated springs of the type set forth in claim 1, characterized by the threads of the fabric extending in one direction comprising the metal wires being formed of threads with metallic wire spun therearound and the other threads for the principal parts thereof constituting the soft absorbing fibrous material.

HUGO REINZ.